(12) United States Patent
Arold et al.

(10) Patent No.: US 7,180,039 B2
(45) Date of Patent: Feb. 20, 2007

(54) HEATER WITH BURNOUT PROTECTION

(75) Inventors: Jonathan B. Arold, Exeter, NH (US);
William H. Gosselin, York, ME (US);
Michael J. Frappier, Concord, NH (US); Joseph P. Stark, Newfields, NH (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 11/161,829

(22) Filed: Aug. 18, 2005

(65) Prior Publication Data

US 2006/0091132 A1    May 4, 2006

Related U.S. Application Data

(60) Provisional application No. 60/522,705, filed on Oct. 29, 2004.

(51) Int. Cl.
*H01H 37/12* (2006.01)
*G01K 7/02* (2006.01)

(52) U.S. Cl. ............. 219/519; 219/494; 219/482; 219/542; 219/546; 374/110; 374/182; 392/360; 392/365; 392/379; 392/478

(58) Field of Classification Search ........ 219/497, 219/505, 536, 546, 548; 392/360, 379, 398, 392/397; 374/110, 182

See application file for complete search history.

(56) References Cited

U.S. PATENT DOCUMENTS

| 3,393,101 | A | * | 7/1968 | Kirkpatrick | 136/224 |
|---|---|---|---|---|---|
| 3,551,643 | A | * | 12/1970 | Plaisted et al. | 392/488 |
| 3,724,261 | A | * | 4/1973 | Kydd et al. | 374/36 |
| 4,314,143 | A | * | 2/1982 | Bilstad et al. | 219/497 |
| 4,642,441 | A | * | 2/1987 | Kenyon | 392/365 |
| 5,111,527 | A |   | 5/1992 | Arold et al. | 392/360 |
| 5,666,929 | A | * | 9/1997 | Knowlton et al. | 123/546 |
| 5,805,767 | A |   | 9/1998 | Jouas et al. | 392/373 |
| 7,002,113 | B2 | * | 2/2006 | Suzuki et al. | 219/482 |
| 2003/0016953 | A1 |   | 1/2003 | Wilson | 392/360 |
| 2004/0105665 | A1 | * | 6/2004 | Schuster et al. | 392/360 |
| 2005/0109764 | A1 | * | 5/2005 | Kopel | 219/494 |

FOREIGN PATENT DOCUMENTS

WO    WO 84/03552    9/1984

* cited by examiner

*Primary Examiner*—Robin Evans
*Assistant Examiner*—Stephen J. Ralis
(74) *Attorney, Agent, or Firm*—Robert F. Clark

(57) ABSTRACT

A heater is provided that has a temperature sensing control system which can be used for both temperature control and over-temperature protection against element burnout. The temperature control system is comprised of an inlet temperature sensing assembly positioned at the inlet to the heater element and an exit thermocouple positioned in the exit end of the heater element. The exit thermocouple may be used for control the heater temperature and provide over-temperature protection. The inlet temperature sensing assembly is used to detect low or no air flow conditions which could lead to heater element failure.

6 Claims, 9 Drawing Sheets

HEATER WITH BURNOUT PROTECTION

CROSS REFERENCE TO RELATED APPLICATIONS

This application claims the benefit of U.S. Provisional Application Ser. No. 60/522,705, filed Oct. 29, 2004.

BACKGROUND OF THE INVENTION

Standard hot-air heaters can overheat quickly leading to element failure, particularly under conditions of reduced or no air flow. Prior attempts at preventing element failure caused by over-temperature conditions involved attaching a thermocouple directly to the element winding, placing a thermistor in the preheater section of the element winding, or using an optical sensor to detect element temperature.

SUMMARY OF THE INVENTION

The heater of this invention has a temperature sensing control system which can be used for both temperature control and over-temperature protection against element burnout. The temperature control system is comprised of an inlet temperature sensing assembly positioned at the inlet to the heater element and an exit thermocouple positioned in the exit end of the heater element. The exit thermocouple may be used for control the heater temperature and provide over-temperature protection. The inlet temperature sensing assembly is used to detect low or no air flow conditions which could lead to heater element failure.

In one embodiment, the heater configuration will have a single element winding in a ceramic tube for single phase use. In another embodiment, the heater configuration has multiple heater elements comprised of multiple parallel element windings in multiple ceramic tubes for higher wattage single or three phase applications. Preferably, the multi-heater element embodiment has six heater elements. However, other numbers of heater elements are possible which allows for heater to be adapted to the needs of the user.

DETAILED DESCRIPTION OF THE INVENTION

For a better understanding of the present invention, together with other and further objects, advantages and capabilities thereof, reference is made to the following disclosure and appended claims taken in conjunction with the above-described drawings.

Figure 1:
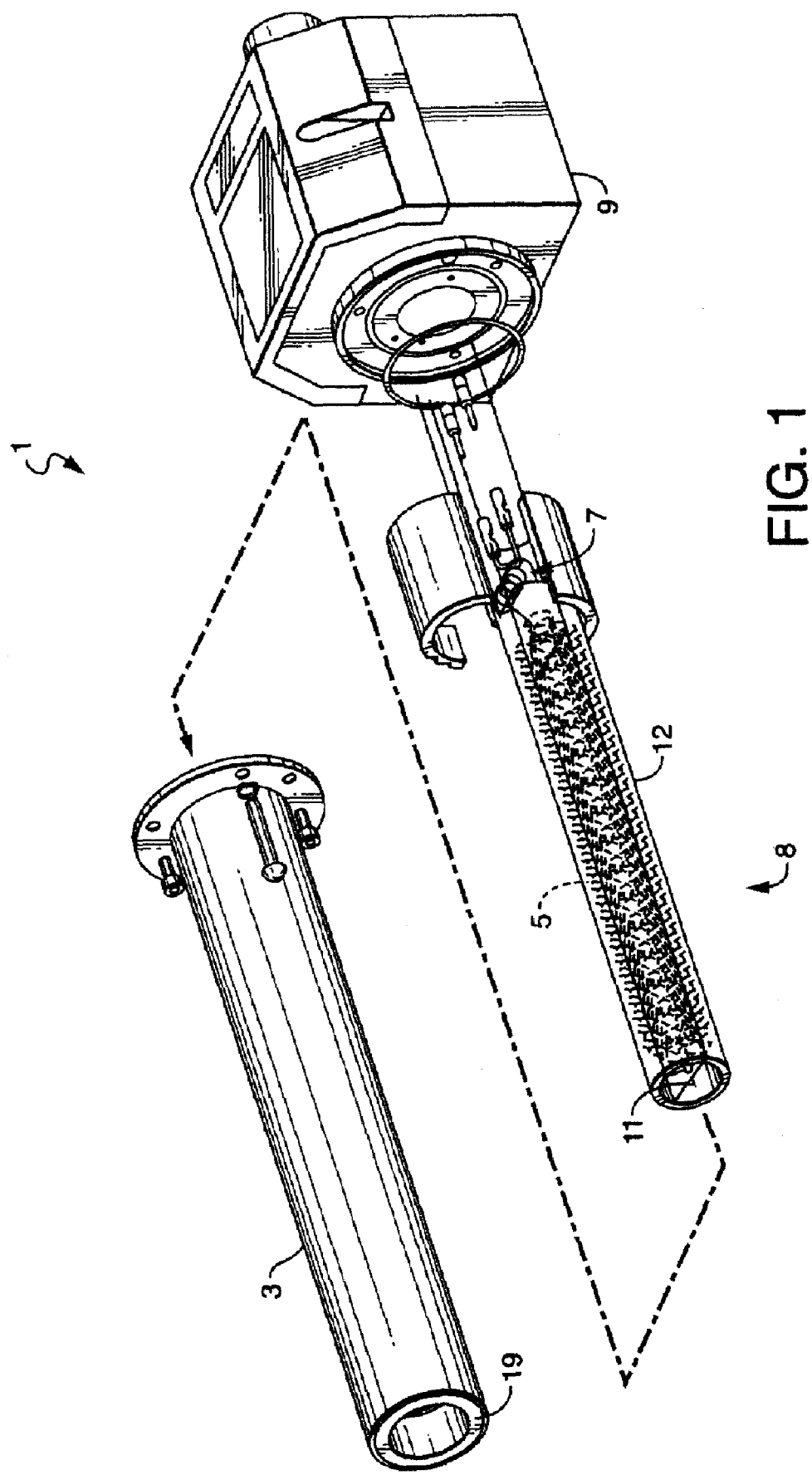
FIG. 1 is an exploded view of a single-element heater according to a preferred embodiment of this invention.
Figure 2:
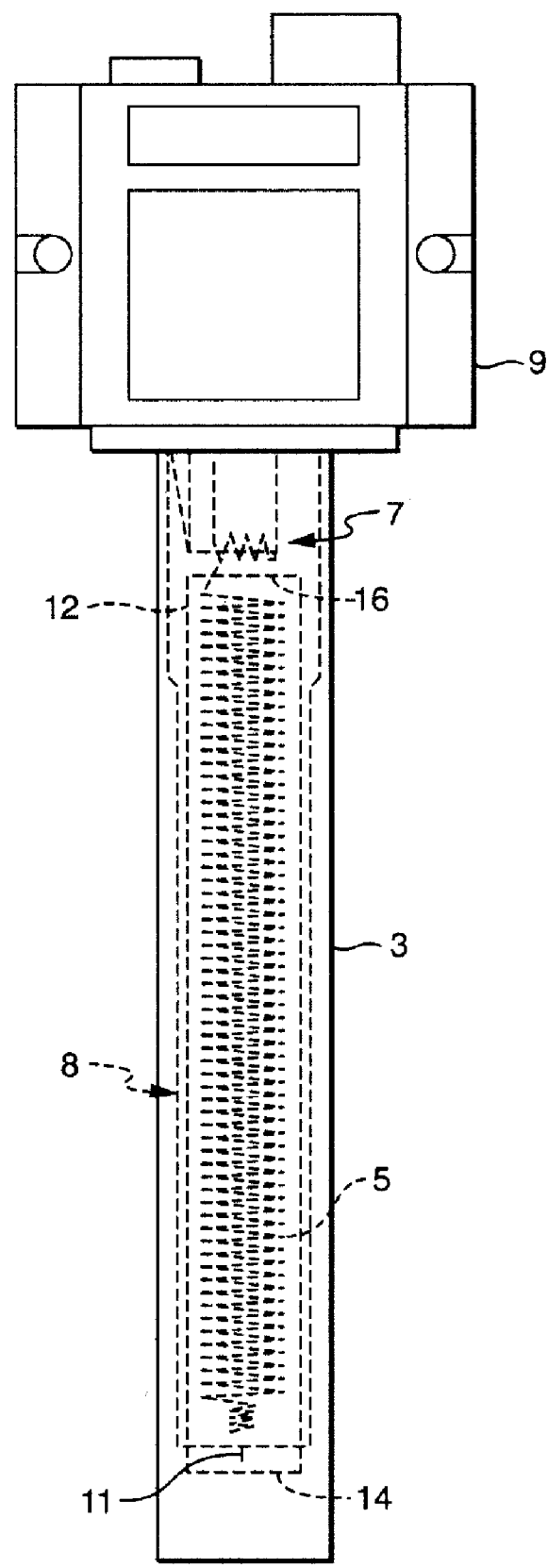
FIG. 2 is a cross-sectional view of the single-element heater of FIG. 1.
Figure 10:
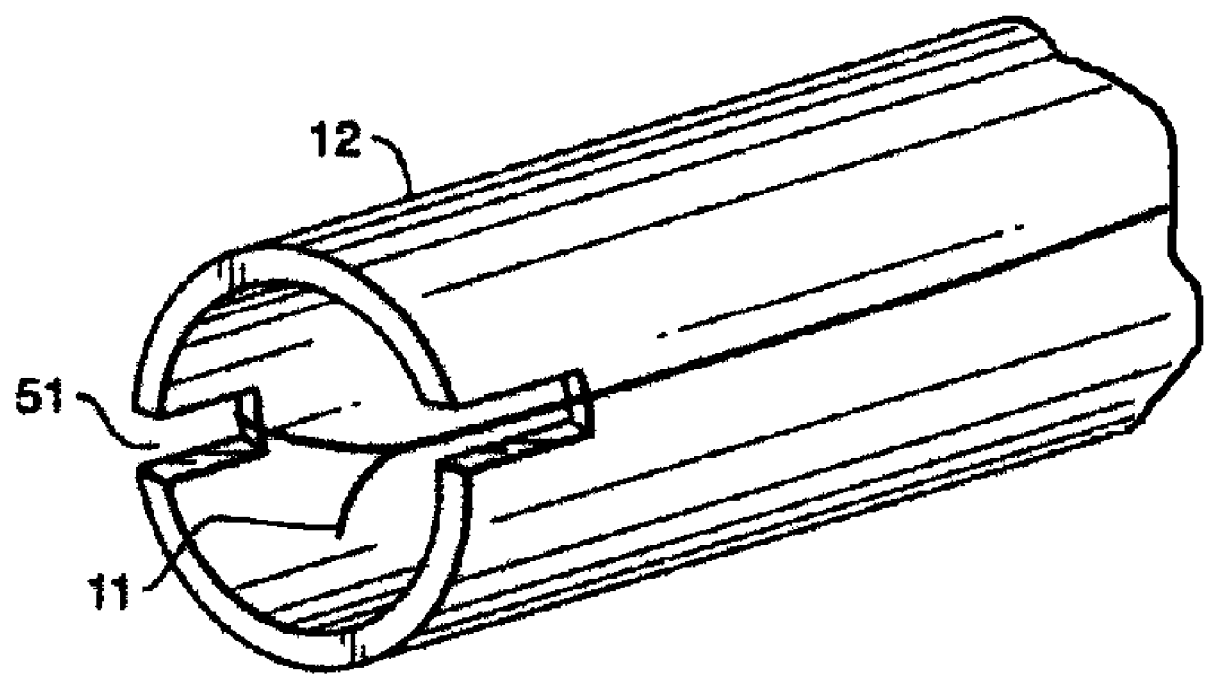
FIG. 10 is a cut-away view of the ceramic tube and the exit thermocouple.

Referring to FIGS. 1 and 2, there is shown an exploded view of a single-element heater 1 according to a preferred embodiment of this invention. The heater 1 has a heater housing 3 and base 9 which provides electrical power and air inlet connections. A single heating element 8 is disposed within heater housing 3. The heater element 8 has element winding 5 which is contained within ceramic tube 12. The temperature control system for the heater comprises exit thermocouple 11 and inlet temperature sensing assembly 7. The thermocouple 111 is placed inside the ceramic tube 12 near the exit 14 of the heater element 8. This placement is better illustrated in FIGS. 2 and 10. Preferably, a slot 51 is cut in the ceramic tube so that the thermocouple can be in close proximity to the element winding. A thermocouple placed in this location provides faster response than a thermocouple attached to the exit 19 of the heater housing. Fast response is required for heaters having a fast response of the heater element winding. Without a fast thermocouple response, the heater element winding can overheat before the control thermocouple has reacted to a temperature increase. Fast response heaters are heaters where the time constant of the heater is as fast or faster than the time constant of the thermocouple. The time constant will vary depending on the air flow, heater wattage and set point temperature. Response times are generally in the range of 5 to 15 seconds for both the thermocouples and the heater elements. The thermocouple wire size should be selected to optimize the response time and the strength of the wire. Preferably, the thermocouple wire preferably has a diameter of about 0.020". Heavier wire would have a slower response time and finer wire would not be as robust.

Figure 7:
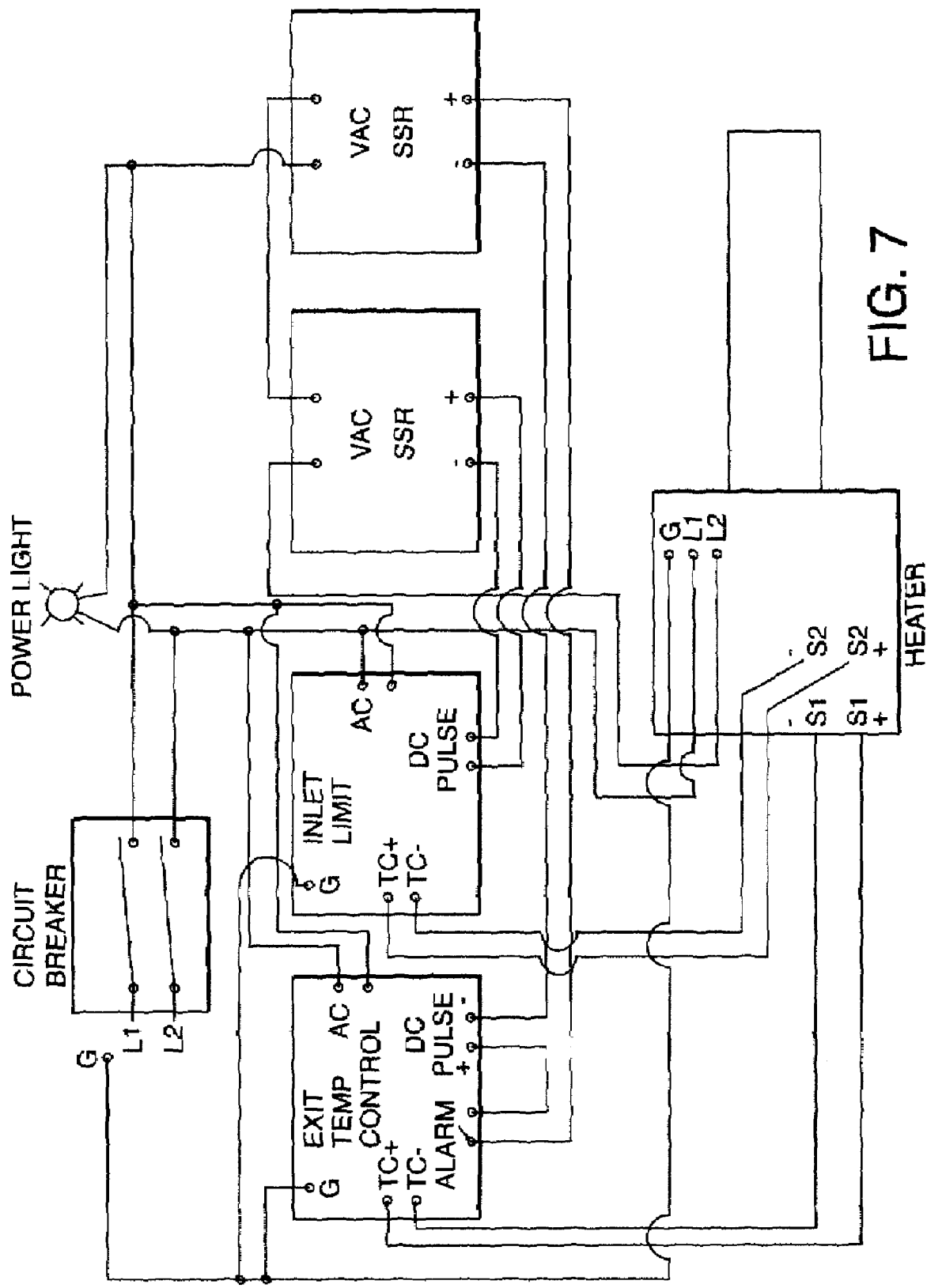
FIG. 7 is a schematic illustration of a temperature control circuit for a heater according to this invention.

The exit thermocouple is intended primarily to provide a temperature indication to be used to limit the maximum exit temperature and thereby prevent over-temperature operating conditions which will cause heater failure. This protection can be achieved by connecting this thermocouple to a simple relay output temperature controller to cut power before an over-temperature condition that could cause heater failure exists. The exit thermocouple can also be used to control the exit temperature of the heater. The operator can set a maximum temperature on their temperature controller. This thermocouple can also be used to trigger an alarm condition on the temperature controller which will provide burnout protection. An example of a temperature control circuit is shown in FIG. 7.

Figure 3:
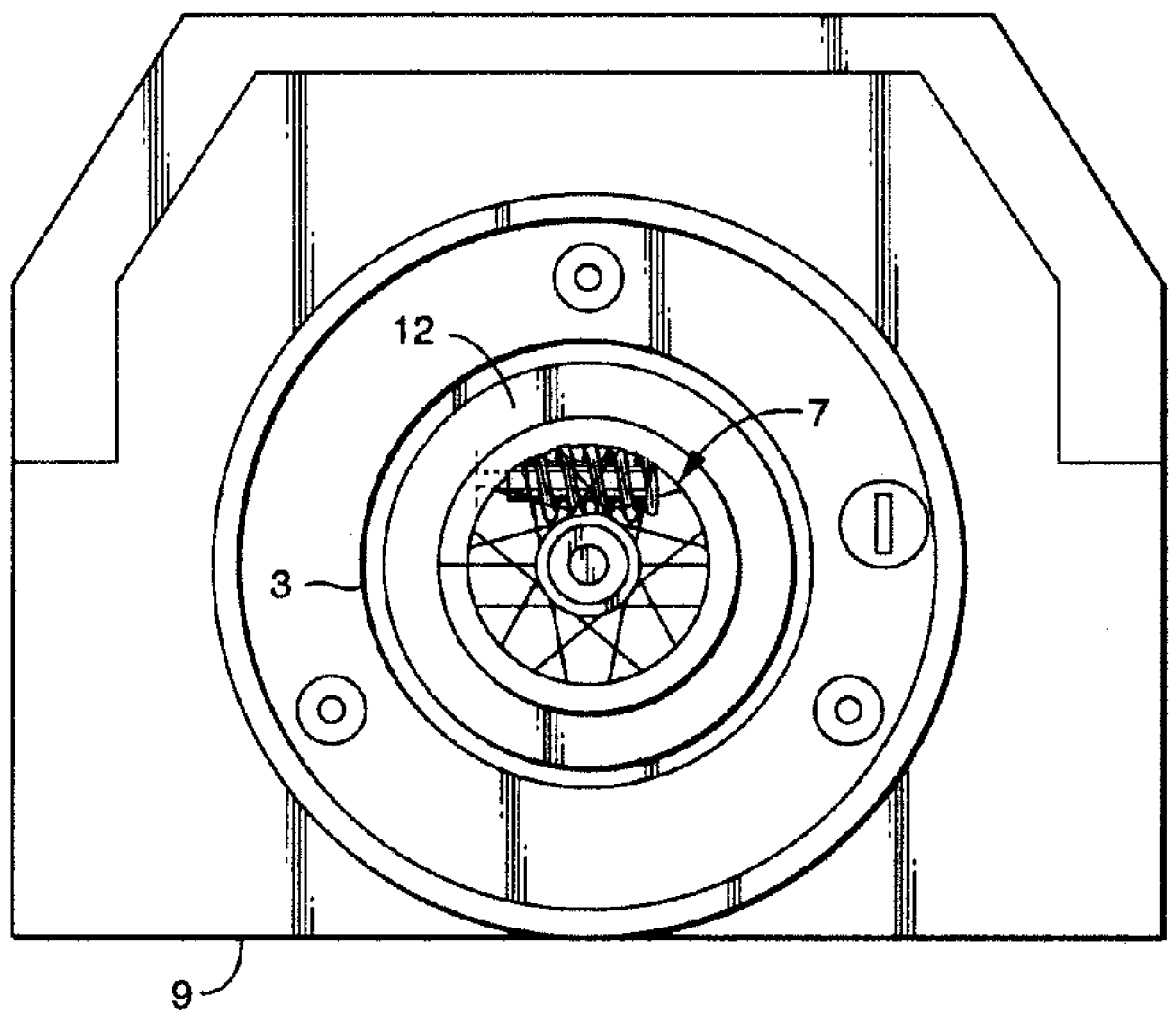
FIG. 3 is an end view of the exit end of the single-element heater of FIG. 1.
Figure 4:
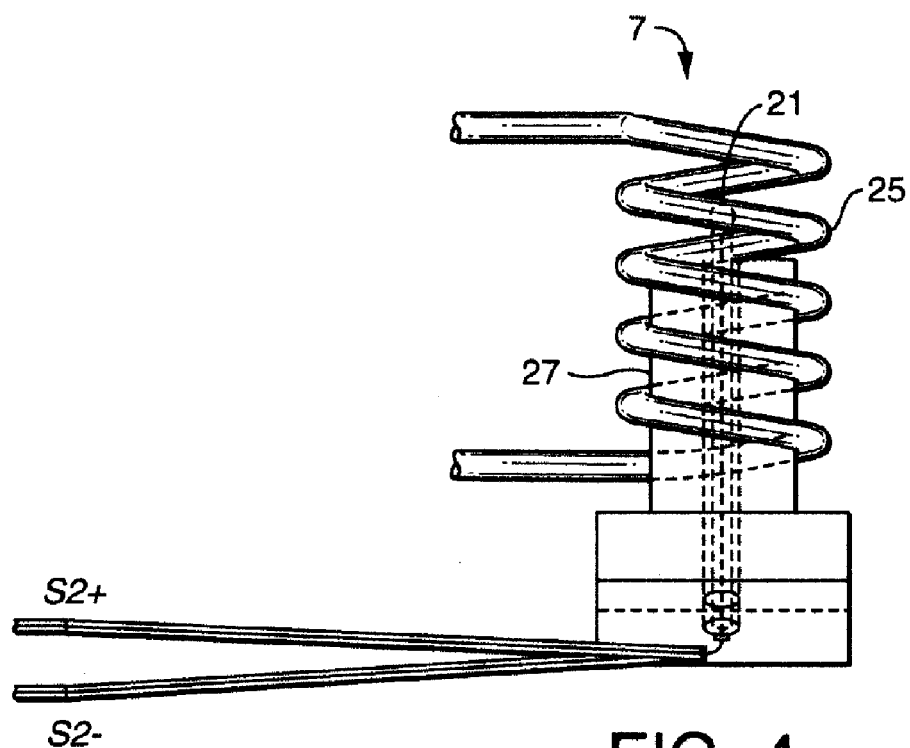
FIG. 4 is an illustration of the inlet temperature sensing assembly of FIG. 1.
Figure 5:
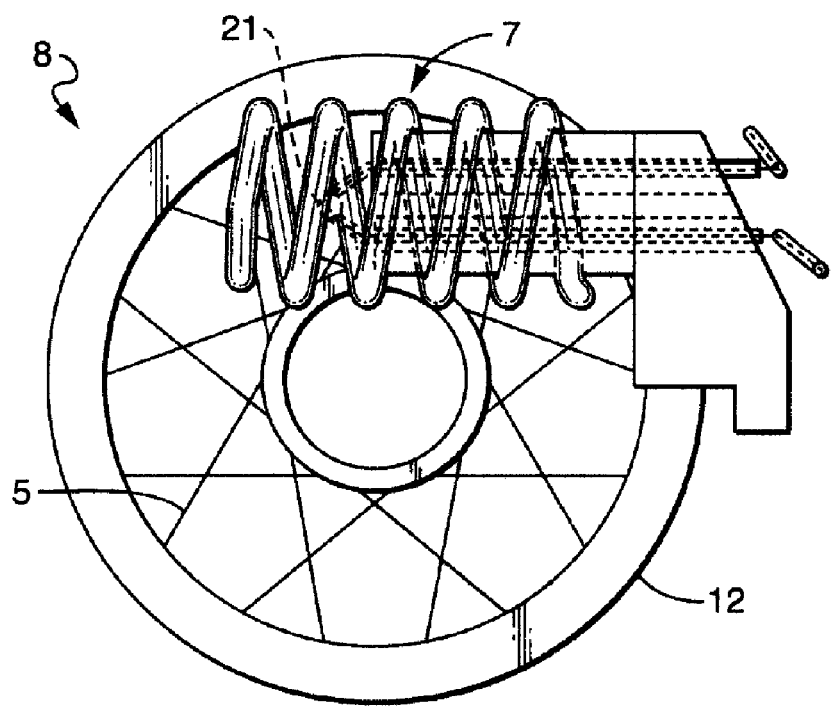
FIG. 5 is an illustration of spatial relationship of the inlet temperature sensing assembly with respect to the heater element of FIG. 1 as viewed from the inlet end of the heater.
Figure 6:
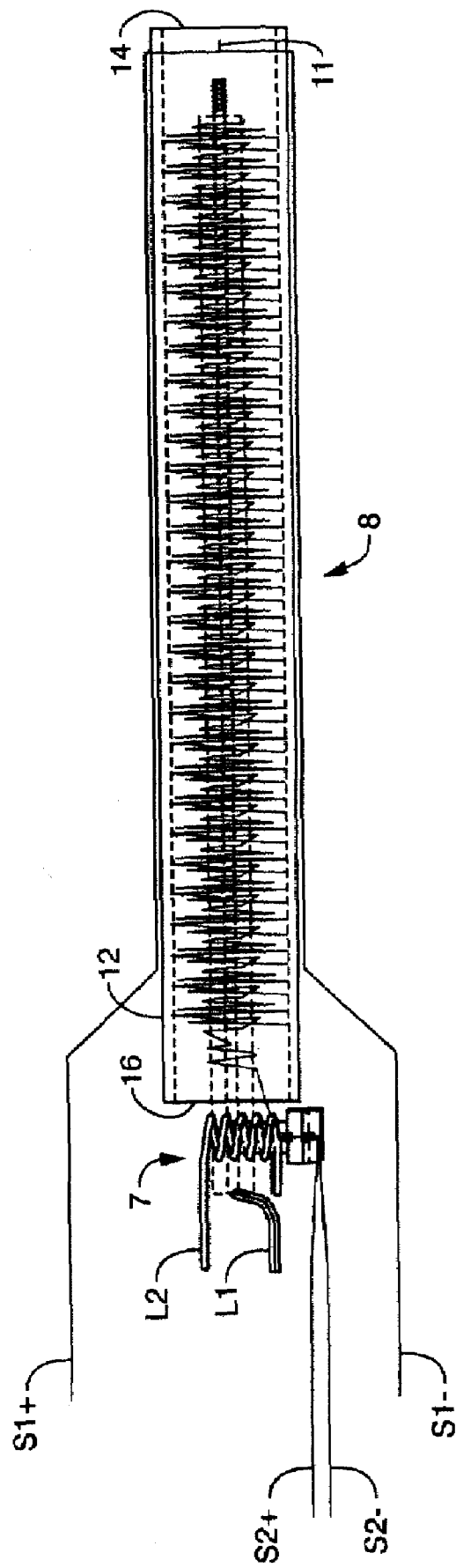
FIG. 6 is an illustration of the temperature control system of the single-element heater shown in FIG. 1.

Inlet temperature sensing assembly 7 containing inlet thermocouple 21 is located at the inlet end 16 of heater element 8. Referring to FIG. 4, the inlet thermocouple 21 is shown mounted inside a coil 25 made of resistance wire and having a ceramic support 27. Electrical connections are provided by leads S2+ and S2−. Preferably, the inlet temperature sensing assembly is oriented 90° to the central axis of heater element 8 and located at an offset position as shown in FIGS. 3 and 5. The components of the temperature control system are shown in FIG. 6 in relation to heater element 8. Electrical leads S1+ and S1− run down the length of the ceramic tube 12 of heater element 8 to provide electrical connections to exit thermocouple 11. Electrical power to the heater element and the coil 25 of the inlet temperature sensing assembly 7 are provide by electrical leads L1 and L2.

The function of the inlet thermocouple 21 is to provide burnout protection for the heater under conditions of low or no air flow. As air flow through the heater element 8 is reduced, the ability of the exit thermocouple 11 to accurately monitor the heater element temperature is greatly reduced. Under conditions of no air flow, the exit thermocouple will not be able to detect element temperature which will result in element burnout. By mounting the inlet thermocouple 21 inside a coil, an area is created that will heat up when air flow is low or stops. During normal operation, the air will flow through the coil. Mounting the inlet thermocouple 21 inside coil 25 allows the coil/thermocouple to function independently of heater orientation. The coil is designed to have a low wattage so that the temperature inside the coil will increase only minimally under normal operating conditions. When air flow is low or absent, the air inside the coil becomes heated and the inlet thermocouple inside the coil detects the temperature increase. The output from the inlet thermocouple is used to limit temperature inside the coil and thereby protect the heater element from burnout during low and no air flow conditions. Protection is achieved by connecting the inlet thermocouple to a over-temperature controller such as the one illustrated in FIG. 7. The temperature controllers send a DC pulse to activate the respective solid state relays (SSR) when the over temperature conditions are detected at either the inlet or the exit of the heater element. This disconnects the input electrical power to the heater to prevent failure of the heater element.

The inlet temperature of the heater element will naturally be much lower than the exit temperature. In a preferred embodiment, the temperature inside the inlet temperature sensing assembly should be limited about 300° F. and the temperature at the exit thermocouple should be limited to about 1400° F. These temperatures may be adjusted to accommodate various changes in heater configurations and heater elements as well as the desired degree of over-temperature protection. Preferably, the exit thermocouple is Type K. The inlet thermocouple is preferably a Type J or a Type K because the inlet temperature is much lower. During normal operation there will be some overshoot, but in general the maximum temperature at the inlet thermocouple will be approximately 400° F. Using a Type K thermocouple to monitor both the inlet and exit temperatures makes it easier to set up the electronic controls.

Figure 8:
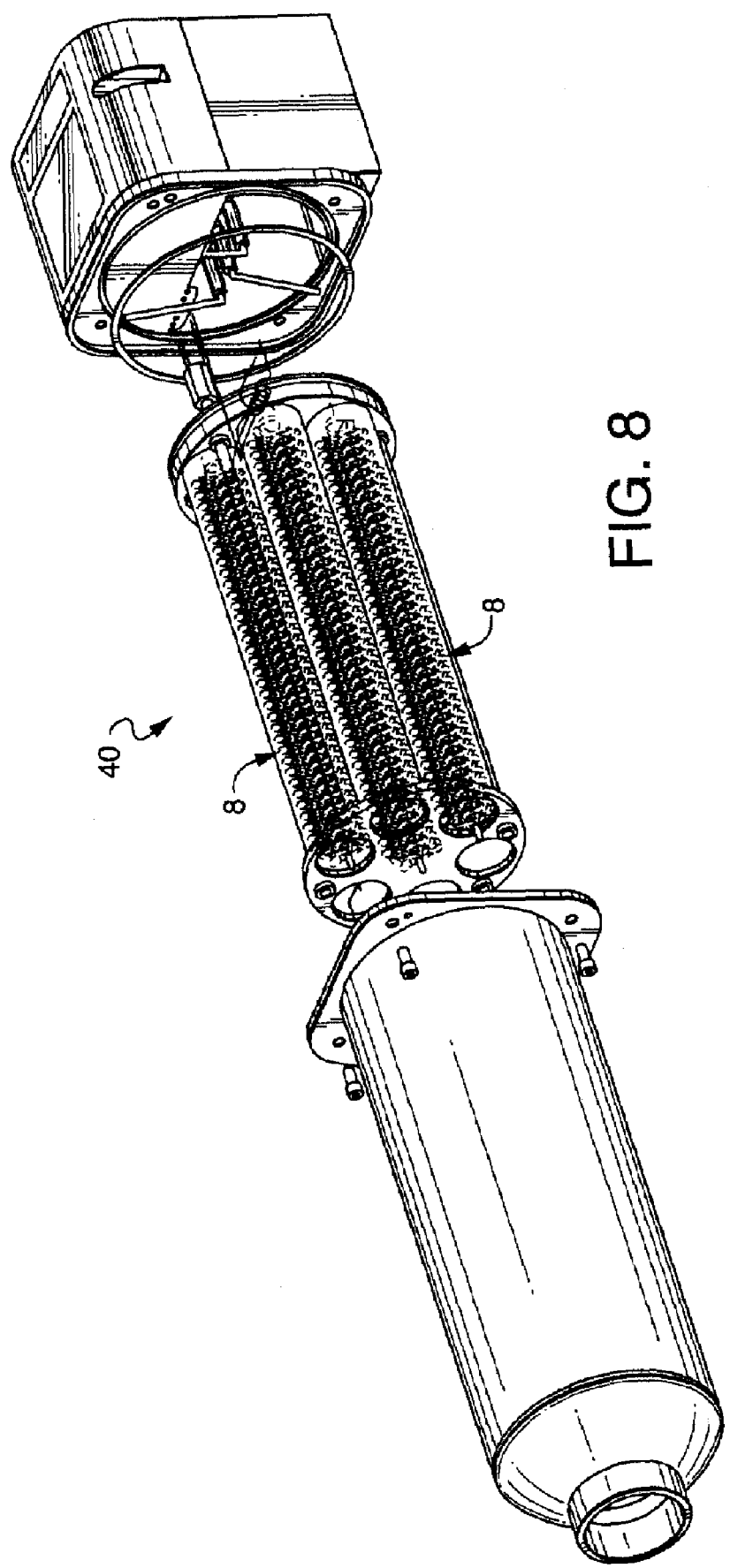
FIG. 8 is an exploded view of a six-element heater according to an alternate embodiment of this invention.
Figure 9:
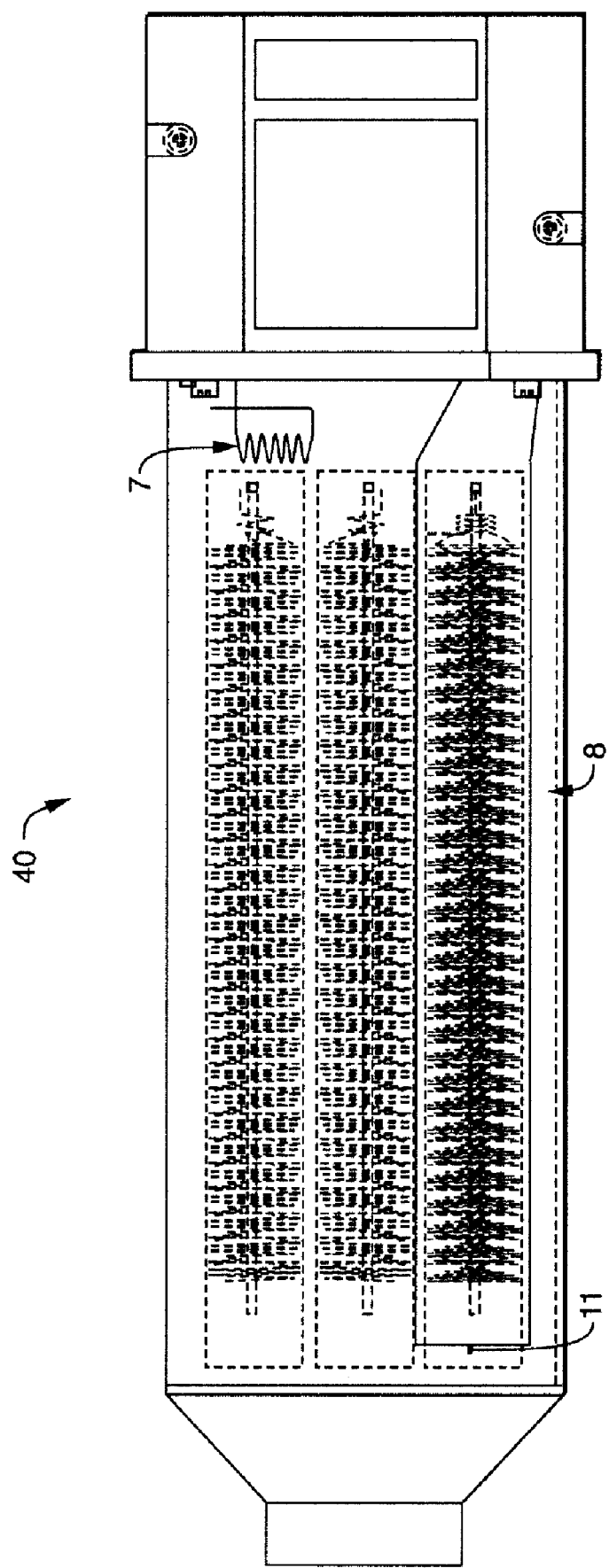
FIG. 9 is a cross sectional view of the assembled six-element heater shown in FIG. 8.

FIGS. 8 and 9 illustrate an alternate embodiment of the heater according to this invention. In this case, heater 40 has six heater elements 8. The inlet temperature assembly 7 is again located at the inlet end of the heater elements and only one of the heater elements is fitted with an exit thermocouple 11.

While there has been shown and described what are at the present considered the preferred embodiments of the invention, it will be obvious to those skilled in the art that various changes and modifications may be made therein without departing from the scope of the invention as defined by the appended claims.

What is claimed is:

1. A heater comprising: a temperature control system and a heater element disposed in a heater housing, the temperature control system comprising an inlet temperature sensing assembly and an exit thermocouple, the exit thermocouple being positioned at an exit end of the heater element, the inlet temperature sensing assembly being positioned at an inlet end of the heater element, and comprising a resistive coil and an inlet thermocouple; the resistive coil being mounted on a ceramic support and having a coil section that extends beyond the ceramic support, and the inlet thermocouple being disposed axially within the coil section; and wherein the inlet thermocouple and the exit thermocouple are each connected to a respective temperature controller that activates a relay when a maximum temperature condition is sensed, the relay when activated disconnecting electrical power to the heater.

2. The heater of claim 1 wherein the heater element and the resistive coil are connected in series.

3. The heater of claim 1 wherein the heater element has a central axis and the inlet temperature assembly is oriented 90° to the central axis of the heater element.

4. The heater of claim 1 wherein the heater element has a central axis and the inlet temperature assembly is offset from the central axis of the heater element.

5. The heater of claim 1 wherein the thermocouples and the heater element have a response time in the range of 5 to 15 seconds.

6. The heater of claim 1 wherein the heater element comprises a ceramic tube containing an element winding, the ceramic tube having slots in an end to receive the exit thermocouple.

\* \* \* \* \*